(12) United States Patent
Kochem et al.

(10) Patent No.: US 9,725,062 B2
(45) Date of Patent: Aug. 8, 2017

(54) SEAT ARRANGEMENT WITH SIDE AIRBAG

(71) Applicant: Ford Global Technologies, LLC, Dearborn, MI (US)

(72) Inventors: Hans-Georg Kochem, Cologne (DE); Christoph Beckmann, Erftstadt (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/003,898

(22) Filed: Jan. 22, 2016

(65) Prior Publication Data
US 2016/0214560 A1    Jul. 28, 2016

(30) Foreign Application Priority Data
Jan. 26, 2015   (DE) .................. 10 2015 201 216

(51) Int. Cl.
*B60R 21/207*   (2006.01)
*B60R 21/216*   (2011.01)
*B60R 21/2165*  (2011.01)
*B60R 21/231*   (2011.01)
*B60R 21/16*    (2006.01)

(52) U.S. Cl.
CPC ........ *B60R 21/2165* (2013.01); *B60R 21/207* (2013.01); *B60R 21/216* (2013.01); *B60R 2021/161* (2013.01); *B60R 2021/2076* (2013.01); *B60R 2021/21654* (2013.01); *B60R 2021/23146* (2013.01)

(58) Field of Classification Search
CPC . B60R 21/207; B60R 21/216; B60R 21/2165; B60R 2021/23146; B60R 2021/21531; B60R 2021/161; B60R 2021/2076; B60R 21/18; B60N 2/42; B60N 2/64; B60N 2002/5808
See application file for complete search history.

(56) References Cited

U.S. PATENT DOCUMENTS

| | | | | |
|---|---|---|---|---|
| 5,749,597 A | * | 5/1998 | Saderholm | B60R 21/201 |
| | | | | 280/728.2 |
| 5,860,673 A | * | 1/1999 | Hasegawa | B60R 21/207 |
| | | | | 280/728.3 |
| 5,893,579 A | * | 4/1999 | Kimura | B60N 2/5825 |
| | | | | 280/728.3 |

(Continued)

FOREIGN PATENT DOCUMENTS

| | | | |
|---|---|---|---|
| JP | 10338097 A | * | 12/1998 |
| JP | 11115676 A | * | 4/1999 |

(Continued)

*Primary Examiner* — Laura Freedman
(74) *Attorney, Agent, or Firm* — Vichit Chea; Price Heneveld LLP (57) ABSTRACT

A seat arrangement for a vehicle includes a side airbag. The seat arrangement includes a support frame to which the side airbag is fixed in position and which is upholstered by an upholstery member. A cover terminates the seat arrangement toward an outer side. A tear seam is provided for an abrupt opening of the cover by the side airbag. A non-expandable surface structure is provided at both sides of the tear seam, which is counter-supported on the seat arrangement. At least one of the non-expandable surface structures is counter-supported on the upholstery member.

19 Claims, 4 Drawing Sheets

(56) References Cited

U.S. PATENT DOCUMENTS

| | | | | |
|---|---|---|---|---|
| 5,938,232 A * | 8/1999 | Kalandek | ............ | B60R 21/207 280/728.3 |
| 5,967,546 A * | 10/1999 | Homier | ............ | B60N 2/5883 280/730.2 |
| 5,967,603 A * | 10/1999 | Genders | ............ | B60R 21/207 280/730.2 |
| 5,988,674 A * | 11/1999 | Kimura | ............ | B60R 21/207 280/728.3 |
| 6,003,939 A * | 12/1999 | Nakai | ............ | B60R 21/207 297/216.13 |
| 6,045,151 A * | 4/2000 | Wu | ............ | B60R 21/207 280/728.3 |
| 6,074,003 A * | 6/2000 | Umezawa | ............ | B60R 21/207 280/730.1 |
| 6,357,789 B1 * | 3/2002 | Harada | ............ | B60R 21/207 280/728.3 |
| 6,578,911 B2 * | 6/2003 | Harada | ............ | B60N 2/5825 280/730.2 |
| 7,195,274 B2 * | 3/2007 | Tracht | ............ | B60R 21/207 280/728.3 |
| 7,232,150 B2 * | 6/2007 | Nagayama | ............ | B60R 21/20 280/728.3 |
| 7,331,601 B2 * | 2/2008 | Tracht | ............ | B60R 21/207 280/728.2 |
| 7,341,275 B2 * | 3/2008 | Miyake | ............ | B60R 21/207 280/730.2 |
| 7,556,287 B2 * | 7/2009 | Inoue | ............ | B60R 21/207 280/728.2 |
| 8,152,197 B2 * | 4/2012 | Taguchi | ............ | B60R 21/207 280/728.2 |
| 8,474,858 B2 * | 7/2013 | Urabe | ............ | B60R 21/207 280/728.2 |
| 8,974,004 B2 * | 3/2015 | Sakamoto | ............ | B60N 2/64 297/218.1 |
| 9,545,892 B2 * | 1/2017 | Zimmermann | ............ | B60R 21/207 |
| 9,566,931 B2 * | 2/2017 | Keer | ............ | B60R 21/207 |
| 2008/0296941 A1 * | 12/2008 | Bederka | ............ | B60R 21/207 297/216.1 |
| 2015/0076802 A1 * | 3/2015 | Tanabe | ............ | B60N 2/68 280/730.2 |
| 2015/0336528 A1 * | 11/2015 | Tanabe | ............ | B60R 21/207 280/728.2 |

FOREIGN PATENT DOCUMENTS

| | | | |
|---|---|---|---|
| JP | 11129856 A | * | 5/1999 |
| JP | 2011093479 A | * | 5/2011 |
| JP | 2011178269 A | * | 9/2011 |
| JP | 2014210475 A | * | 11/2014 |

* cited by examiner

SEAT ARRANGEMENT WITH SIDE AIRBAG

FIELD OF THE DISCLOSURE

The invention relates to a seat arrangement for a vehicle having a side airbag, wherein the seat arrangement has a support frame to which the side airbag is fixed in position and which is upholstered by means of an upholstery member, and a cover which terminates the seat arrangement toward the outer side and which is provided with a tear seam for the abrupt opening of the cover by the side airbag, and wherein there engages at both sides of the tear seam a non-expandable surface structure which is counter-supported on the seat arrangement.

BACKGROUND OF THE DISCLOSURE

It is known that a side airbag is inflated in an explosive manner when in use. Since the side airbag is integrated in the seat arrangement and consequently has to pass through the cover during the inflation thereof, the tear seam is provided as a weak location which holds the cover together and which, under the pressure of the inflating airbag, bursts open on the cover to form a path through the cover. However, the cover has a degree of resilience, which delays the tearing open of the tear seam and consequently delays the passage of the side airbag through the cover.

SUMMARY OF THE DISCLOSURE

According to one aspect of the present disclosure, a seat arrangement for a vehicle includes a side airbag. The seat arrangement includes a support frame to which the side airbag is fixed in position and which is upholstered by an upholstery member. A cover terminates the seat arrangement toward an outer side. A tear seam is provided for an abrupt opening of the cover by the side airbag. A non-expandable surface structure is provided at both sides of the tear seam, which is counter-supported on the seat arrangement. At least one of the non-expandable surface structures is counter-supported on the upholstery member.

According to another aspect of the present disclosure, a seat arrangement for a vehicle includes a support frame with a side airbag fixed thereto. An upholstery member is upholstered over the side airbag. A cover includes a tear seam. A non-expandable surface structure is disposed at both sides of the tear seam. A retention member includes a wire structure that counter-supports at least one of the non-expandable surface structures.

According to yet another aspect of the present disclosure, a seat arrangement for a vehicle includes a side airbag operably coupled with a support frame to which the side airbag is fixed in position and which is upholstered by an upholstery member. A cover is provided on the seat arrangement and includes a tear seam. A non-expandable surface structure is provided at both sides of the tear seam, which is counter-supported on the seat arrangement.

An object of the invention is to provide a seat arrangement having a mat device which is constructed and can be assembled in a simpler manner. Furthermore, it should contribute to the reduction of the reaction time.

These and other aspects, objects, and features of the present disclosure will be understood and appreciated by those skilled in the art upon studying the following specification, claims, and appended drawings.

DESCRIPTION OF THE DRAWINGS

The present invention is explained in greater detail below with reference to a plurality of embodiments of the seat arrangement which are illustrated in drawings, wherein the illustrations are purely schematic in each case. In the drawings.

DESCRIPTION OF THE EMBODIMENTS

Figure 1:
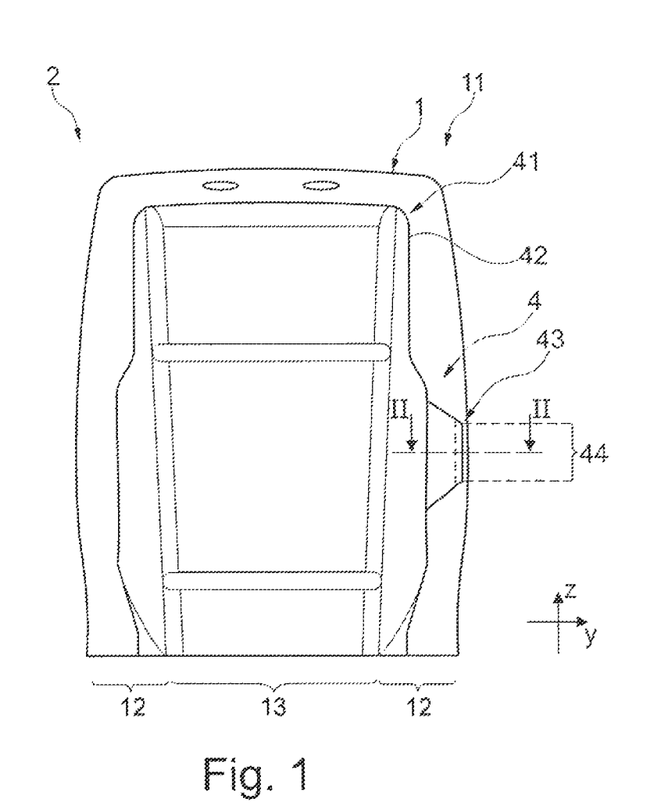
FIG. 1 is a front view of a backrest of a seat arrangement with an inlaid wire structure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In order to provide an overview of the positioning of the components, FIG. 1 is a front view of a backrest 1 of a seat arrangement 2 having an upholstery member 3 and a retention member 4 in the form of a wire structure 41 which is placed in the upholstery member 3 and which has a branch 42 on which, as illustrated below, a non-expandable surface structure engages. FIGS. 2 and 4-8 each show a cross-section along the cross-section path II-II in FIG. 1 perpendicularly to the Z direction of an embodiment of the seat arrangement 2. FIG. 3a is a detailed view along the cut-out III in FIG. 2. FIG. 3b shows a possible basic form of the non-expandable surface structure 5.

The seat arrangement 2 has a support frame 6 on which a side airbag 7 is fixed in position and which is upholstered toward the outer side by means of the upholstery member 3. A cover 8 is provided that terminates the seat arrangement 2 toward the outer side and which includes a tear seam 81 for abrupt opening by the side airbag 7 which inflates in an explosive manner during use. With the exception of FIG. 4, in all embodiments of the seat arrangement 2, a non-expandable surface structure 5 engages at both sides of the tear seam 81 with a first end region 51. In a state pressed outward by the side airbag 7 which is inflating in an explosive manner, a tensile load is introduced into the tear seam 81 by the two surface structures 5 or, according to FIG. 4, by the one surface structure 5, whereby the tear seam 81 is torn open in an accelerated manner as a result of the non-expandability of the surface structures 5.

The seat arrangement 2 shown in the figures has a so-called shell seat 11 with the backrest 1 which has a central portion 13 and at both sides thereof a side region 12 which protrudes in each case in the X direction, wherein the side airbag 7 is provided in this case in the side region 12 which is arranged at the door side in the assembly position of the shell seat 11. The support frame 6 and the wire structure 41 extend in a frame-like manner in a plane generally parallel with the Y direction and Z direction in the backrest 1.

As shown in the cross-sectional illustrations of the drawings, there are provided in the side region 12 with the side airbag 7 two upholstery portions, that is to say, a front upholstery portion 31 in the X direction and a rear upholstery portion 32 in the X direction, wherein these are supported laterally on the support frame 6. The side airbag 7 is further arranged between the two upholstery portions 31, 32 and with spacing from the cover 8, wherein the two upholstery portions 31, 32 delimit a discharge path a of the side airbag in an outward direction toward the cover 8. The tear seam 81 and the upholstery portions 31, 32 are thus arranged with respect to the side airbag 7 in such a manner that it is discharged laterally and forward from the side region 12 of the backrest 1 when the tear seam 81 is torn open. The tear seam 81 extends in the X direction forward with respect to the discharge path a and at the height of the front upholstery portion 31 and in this instance in the transition of the path of the lateral contour of the backrest 1 in the X direction into the Y direction. The cover 8 is thereby tensioned with the tear seam 81 via the front upholstery portion 31, whereby the tear seam 81 can tear open more rapidly with the inflation of the side airbag 7.

In the embodiments of the seat arrangement 2 according to FIGS. 2 and 4-6, a non-expandable surface structure 5 is counter-supported with a second end region 52 on one of the upholstery portions 31, 32 of the upholstery member 3, and consequently secured thereto. In the embodiments of the seat arrangement 2 according to FIGS. 2, 5, and 6, the other surface structure 5 is counter-supported on the seat arrangement 2 in a conventional form which is not illustrated in greater detail in this instance. In the embodiments of the seat arrangement 2 according to FIGS. 7 and 8, both surface structures 5 which engage on the tear seam 81 are counter-supported on the upholstery portions 31, 32 of the upholstery member 3 or secured to the seat arrangement 2.

Figure 2:
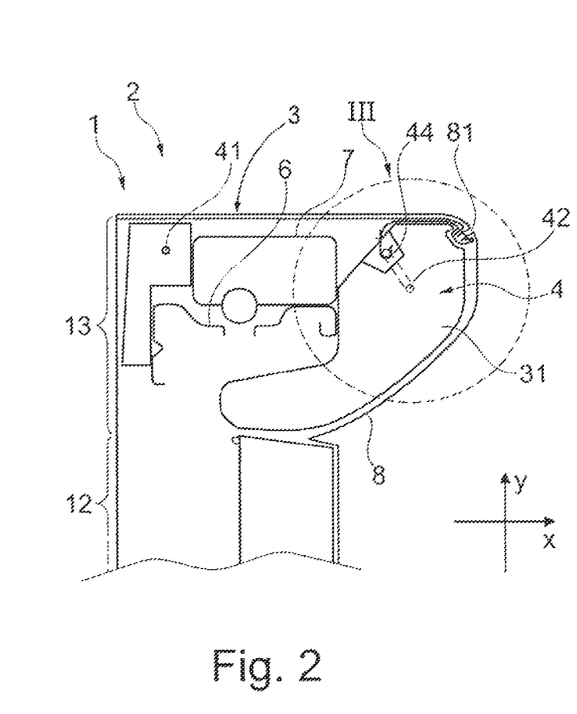
FIG. 2 is a cross-section along the cross-section path II-II in FIG. 1 perpendicularly relative to the Z direction of a first embodiment of the seat arrangement according to FIG. 1.
Figure 3A:
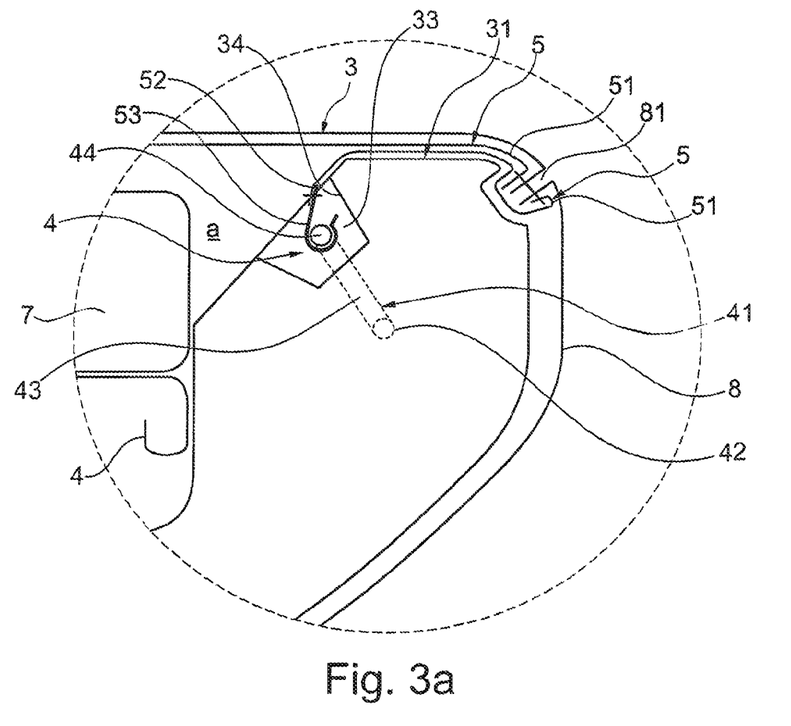
FIG. 3a is a detailed view according to the cut-out III in FIG. 2.
Figure 3B:
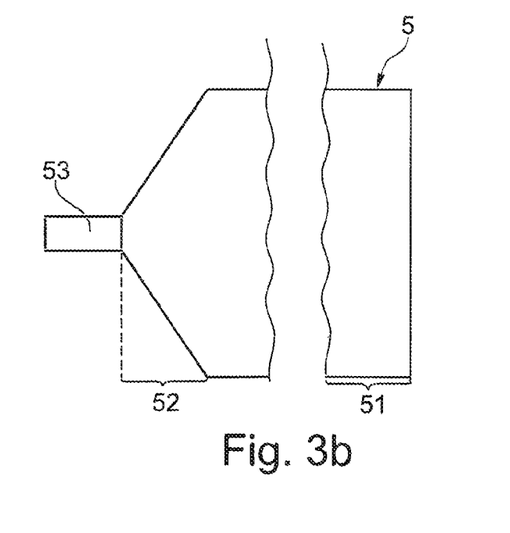
FIG. 3b is an individual illustration of a surface structure.
Figure 4:
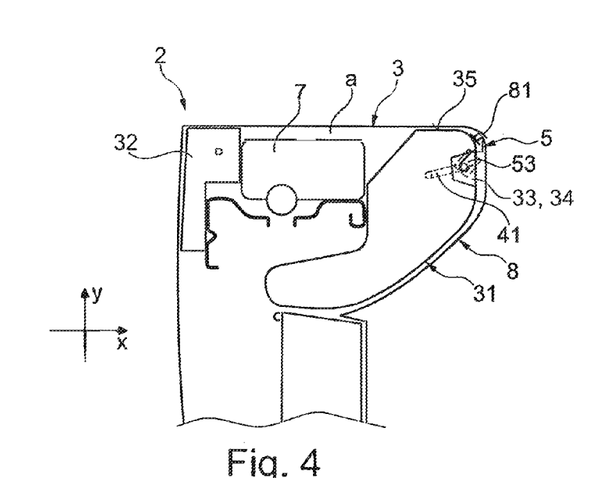
FIG. 4 is a cross-section along the cross-section path II-II in FIG. 1 perpendicularly relative to the Z direction of a second embodiment of the seat arrangement.

In FIGS. 2 and 4-8, two types of the counter-support according to the invention of the surface structure 5 on the upholstery member 3 are illustrated by way of example. In a first type of the counter-support according to the invention (FIG. 1), there is provision for the wire structure 41 to be used as a securing location for the respective surface structure. To this end, the wire structure 41 has an inner structure 42 which extends through the respective upholstery portion 31, 32 and which has a curved branch 43. The branch 43 is accessible from the outer side for the connection of the surface structure 5. To this end, it is provided at approximately mid-height with a vertical portion 44 which extends in this instance substantially in the Z direction at the outer side of the upholstery portion 31, 32, wherein the branch 43 is arranged above and below the vertical portion 44 inside the upholstery portion 31, 32. The upholstery portion 31, 32 has an indentation 34 for delimiting the receiving member 33 (FIGS. 2 and 3a), wherein the branch 43 extends through the indentation 34 with the vertical portion 44 (FIG. 1) and the second end region 52 of the respective surface structure 5 is secured to the vertical portion 44 (FIGS. 2 and 3a).

Figure 6:
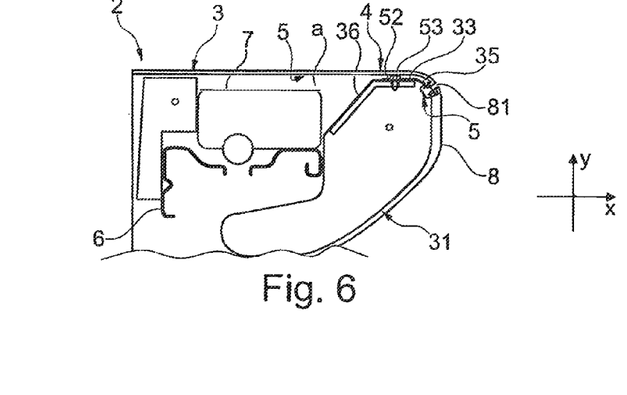
FIG. 6 is a cross-section along the cross-section path II-II in FIG. 1 perpendicularly relative to the Z direction of a fourth embodiment of the seat arrangement.

In the second type of counter-support according to FIG. 6, there is provision for there to be arranged on the front upholstery portion 31 in this instance a plate-like insert 36 with two stabilizing members which are arranged at an angle with respect to each other and which follow the outer contour of the front upholstery portion 31. The insert 36 is cast in the upholstery portion 31 using an in-mould method and is thereby connected to the upholstery portion 31 in a non-positive and positive-locking manner. The insert 36 has an outer side 35 having a receiving member 33 at which the second end region 52 of the surface structure 5 which engages at that location is secured, that is to say, is dowelled to the receiving member 33 in this instance.

FIG. 3b shows by way of example a possible basic form of the surface structure 5, wherein it has a wide first end region 51 for connection to the tear seam 81 and is sewn with and to the tear seam and a conically tapering second end region 52 with a connection element 53. This connection element 53 is in this instance and in the remaining figures illustrated by way of example as a hook-like clip, wherein the invention is not intended to be limited thereto. It is also possible to use any other forms of connection which are suitable for connecting the second end region 52 to the wire structure 41, the insert 36 or other structures and which are particularly suitable for engaging on the upholstery member 3 for connection in the receiving member 33 provided.

The embodiments of the seat arrangement 2 shown in FIGS. 2 and 4-8 differ, in addition to the above-described type of the counter-support according to the invention, in terms of the upholstery portion 31, 32 or the upholstery portions 31, 32 and the sides of the upholstery portions 31, 32 on which the surface structures 5 are counter-supported. This results in different lengths of the individual surface structures 5. In this instance, it is advantageous for a surface structure 5 to have the shortest possible length. This is because the path from the second end region 52 to the first end region 51 is thereby shortened. The running time for transmission of a force impulse which is introduced into the surface structure 5 by the side airbag 7 and which is transmitted to the tear seam 81 and consequently a corresponding reaction time for releasing the side airbag 7 through the cover 8 are thereby accordingly reduced. Furthermore, any resilient and/or plastic expansion of the relevant surface structure 5 which may still occur can thereby be reduced.

In FIGS. 2, 3a, 4, and 6-8, a surface structure 5 engages on the front upholstery portion 31, wherein it extends over the advantageously short path from the tear seam 81 to the receiving member 33 which is provided on the front upholstery portion 31. The receiving member 33 is arranged in FIGS. 2, 3a, 6, and 7 in the direction toward the discharge path a. This has the advantage that the inflating side airbag 7 presses against the receiving member 33 and presses the second end region 52 into the receiving member 33 and reinforces its securing therein. Furthermore, both surface structures are introduced in the X direction laterally on the backrest 1 past the front upholstery portion 31 so that, with the exception of a small region in the above-described transition of the contour, the non-expandable surface structures cannot extend in the Y direction at the front side on the backrest 1 and thereby potentially limit the seating comfort of the user. The receiving member 33 is arranged in FIGS. 4 and 8 at the side of the front upholstery portion 31 directed in the X direction, wherein the cover 8 is advantageously tensioned via the receiving member 33.

Figure 5:
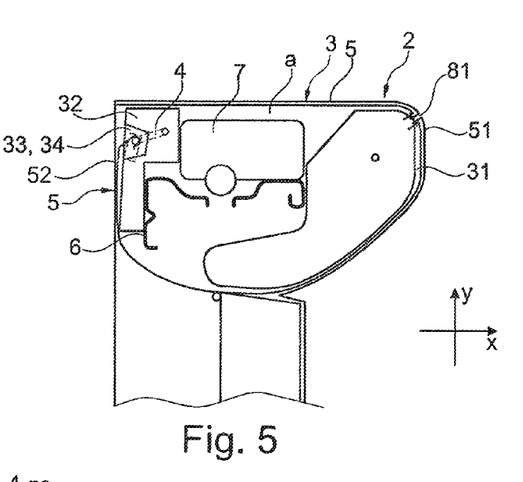
FIG. 5 is a cross-section along the cross-section path II-II in FIG. 1 perpendicularly relative to the Z direction of a third embodiment of the seat arrangement.
Figure 7:
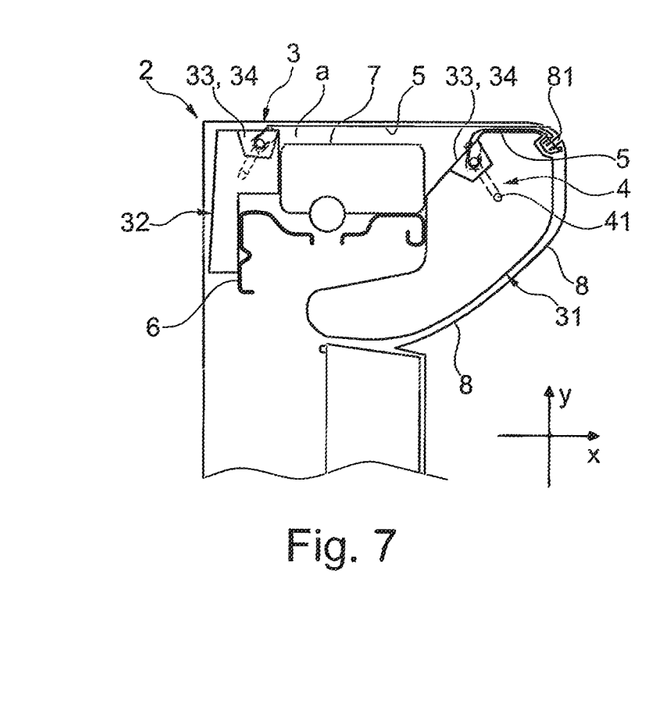
FIG. 7 is a cross-section along the cross-section path II-II in FIG. 1 perpendicularly relative to the Z direction of a fifth embodiment of the seat arrangement.
Figure 8:
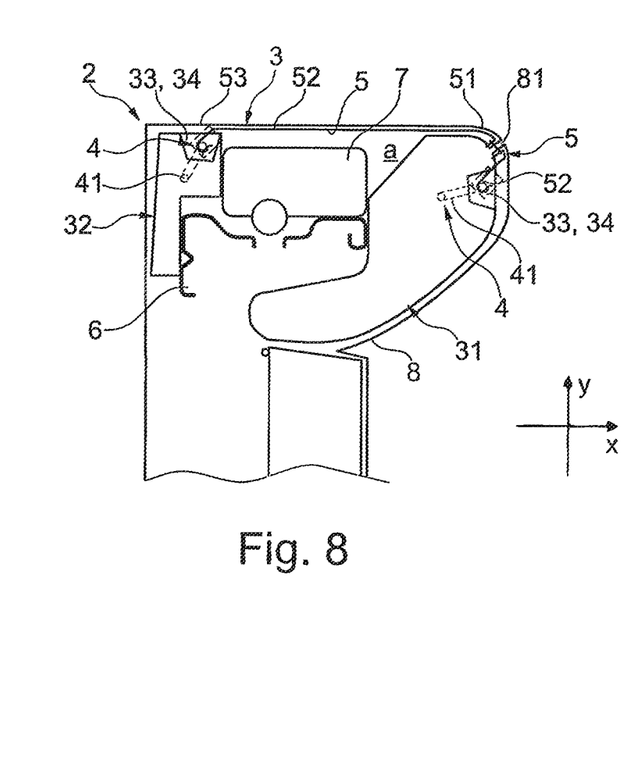
FIG. 8 is a cross-section along the cross-section path II-II in FIG. 1 perpendicularly relative to the Z direction of a sixth embodiment of the seat arrangement.

Other possibilities for connecting the surface structure 5 are shown in FIGS. 5, 7, and 8. In this instance, a receiving member 33 for the surface structure 5 is provided on the rear upholstery portion 32 and, depending on the shortest path of the associated surface structure 5 from the tear seam 81, at the rear side of the second upholstery portion 32 or at the laterally outwardly facing side of the second upholstery portion 32. Not illustrated but conceivable is the support of both surface structures on the rear upholstery portion, for example, by one of the two surface structures engaging at the rear side and the other surface structure engaging at the laterally outwardly facing side of the rear upholstery portion into a receiving member which is provided in each case.

As a result of the connection of at least one of the non-expandable surface structures to the upholstery member, the structure is simplified. The non-expandable surface structure may at least in the region of a first end region, in which it is connected to the tear seam, be arranged with respect to a Z direction radially directly below the cover. It can consequently at least in this region act as the cover in a radially inward direction in the same manner as the cover. Consequently, the surface structure can be more readily installed afterwards or during the assembly before the installation of the cover and be counter-supported on the upholstery member which has been incorporated and which, being arranged for upholstery on the seat arrangement at the outer side and consequently adjacent to the cover or the surface structure, is particularly readily accessible. It does not have to be introduced through the upholstery portions into the seat arrangement in order to be secured to an additional wire at the inner side. Furthermore, it does not have to be guided peripherally around the entire seat arrangement. The surface structure may be arranged so as to be counter-supported on the upholstery member in a second end region facing away from the tear seam. The surface structure may be secured to the upholstery member. For counter-support on the upholstery member, there may be used any type of fixing which is configured, even under impact loading, to be effective in terms of transmitting forces at least until the force for tearing open the tear seam is coupled in the tear seam. The surface structure may in the first end region thereof together with the cover form at least a portion of the tear seam.

The surface structure may be a strip-like formation, for example, in the form of a woven textile, a braided material, a composite material, or an integral strip. In this instance, the surface structure may have at the first end region and/or second end region a connection for connection to the tear seam or to the upholstery member. The first end region and/or second end region may also be constructed to receive a connection piece for the connection of the surface structure to the tear seam or to the upholstery member. For installation in the seat arrangement, the surface structure may be provided with the connection piece at the first end region and/or the second end region. This connection piece may be integrated in the surface structure. The surface structure may have, at the first end region facing the tear seam, a specific surface extent over which the surface structure engages with the tear seam in a substantially linear manner. The surface structure may be combined, in particular sewn together with the cover to form the tear seam. It can be sewn to the cover to form the tear seam. The surface structure may further be constructed so as to taper in a continuous manner for connection to the upholstery member toward the second end region provided.

The term "non-expandable" which is generally conventional in this context with the surface structure in a seat arrangement is also intended to be understood to include the terms "barely expandable" or "expandable to a very small extent." This non-expandability also indicates that the surface structure has a significantly lower level of resilience than the cover.

The surface structure may be arranged below the cover. The surface structure may be arranged so as to be concealed by the cover. The connection of the surface structure to the upholstery member is provided close to the cover. The connection may be provided at a side of the upholstery member which is accessible from the outer side before the seat arrangement is covered with the cover. The connection may be provided at a side face or portion of a side face of the upholstery member which faces radially outward at least with one component.

In a development of the seat arrangement, the upholstery member may have upholstery portions of which at least some are provided with a retention member. In this instance, at least one of the non-expandable surface structures may be arranged so as to be counter-supported on the retention member of the upholstery member. Consequently, an already-provided retention member of an upholstery portion can be used in a cost-effective manner in order to counter-support the surface structure.

The retention member may have a wire structure on which at least one of the non-expandable surface structures may be arranged so as to be counter-supported in a vertical portion of the wire structure. The term "wire structure" is intended to be understood to refer to a structure with elongate wire-like elements which are connected to each other in a force-active manner. The retention member may be secured to the respective associated upholstery portion by means of the so-called in-mould method.

In another embodiment of the seat arrangement, the wire structure may have an inner structure which has a branch and which extends in at least one of the upholstery portions. The branch may be arranged so as to be guided out of the upholstery portion in a curved manner. The branch may extend at the outer side over a linear vertical portion, wherein the surface structure is counter-supported on the vertical portion of the branch. The surface structure may engage via the connection piece on the portion. This connection piece may, for example, be constructed as a clip or as a snap hook.

In a development of the seat arrangement, there is provision for the upholstery portion to have an indentation or a recess which is accessible from the outer side. The branch may be arranged so as to extend through this indentation or recess. Consequently, the surface structure can be readily secured to the upholstery portion. The indentation or recess further provides for the assembly a feature which can be readily visually distinguished and which indicates that the surface structure is intended to be secured at this location.

This indentation or recess may be indicated by a color and/or by a symbol such as an arrow of the upholstery portion. In order to connect the surface structure, a short vertical portion may be sufficient. This alone may form the portion of the wire structure or the branch which extends through the indentation or recess. The vertical portion may be sized in such a manner that a connection piece which is provided, for example, in the form of a clip or a hook, can be docked and secured comfortably onto the branch which extends through the indentation. Consequently, this indentation cannot act or can act slightly on the upholstery properties of the upholstery portion. The branch can be constructed for easier and axially non-displaceable connection of the connection piece in the form of an eyelet or U-shaped member which extends perpendicularly relative to the Z direction.

In a development of the seat arrangement, the retention member may have in at least one of the upholstery portions an insert which is connected to the upholstery portion in a non-positive-locking and/or positive-locking manner. The insert may be secured to the upholstery portion in a planar manner. It may have a receiving member for taking up forces of at least one of the non-expandable surface structures. The receiving member may, for example, have an opening or hole in which the surface structure can be secured, in particular dowelled.

The insert may be formed in such a manner that it is adapted to the outer contour of the upholstery portion which is conventionally arranged in the seat arrangement. The insert may be arranged so as to be secured to the upholstery portion at the outer side. It may extend at least over a portion to secure the surface structure.

The insert may, for example, be injected onto the upholstery portion or be produced therewith in accordance with the multi-component injection-molding method. Advantageously, the insert can be secured to the upholstery portion by means of the so-called in-mould method. In this instance, the insert may be arranged at the edge side on the upholstery portion. For a secure fit, the insert may be arranged so as to be surrounded by the upholstery portion with the exception of an outer side.

The upholstery portion may have a front upholstery portion in the X direction and a rear upholstery portion in the X direction. These may be arranged close to the side airbag in the seat arrangement. The two upholstery portions may define an outward outlet path for the side airbag. To this end, an upholstery portion may be provided at one side of the outlet path, respectively.

In order to further improve the seat arrangement, there may be provision for a non-expandable surface structure to be counter-supported in each case on the front upholstery portion and/or on the rear upholstery portion. In this instance, the type of securing of one surface structure may differ from that of the other surface structure. Both surface structures which engage on the tear seam can consequently be counter-supported on the upholstery member.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seat arrangement for a vehicle comprising:
   a side airbag;
   a support frame to which the side airbag is fixed in position, wherein the side airbag is upholstered by an upholstery member including a plurality of upholstery portions;
   a cover that terminates the seat arrangement toward an outer side;
   a tear seam for an abrupt opening of the cover by the side airbag, wherein the tear seam is surrounded on a first side, a second side, and a third side by a first non-expandable surface structure, and wherein a second non-expandable surface structure is positioned between the first non-expandable surface structure and the first side of the tear seam, and wherein the first side is defined b the upholstery member and the third side is defined by the cover; and at least one of the first and second non-expandable surface structures being counter-supported on the upholstery member.

2. The seat arrangement of claim 1, wherein the plurality of upholstery portions include a front upholstery portion and a rear upholstery portion, and wherein at least one of the front and rear upholstery portions is provided with a retention member, and wherein at least one of the first and second non-expandable surface structures is counter-supported on the retention member of the upholstery member.

3. The seat arrangement of claim 2, wherein the retention member has a wire structure on which at least one of the first and second non-expandable surface structures is counter-supported.

4. The seat arrangement of claim 3, wherein the wire structure has an inner structure which is arranged so as to extend in at least one of the front and rear upholstery portions, and wherein the wire structure has a branch that is guided in a curved manner out of the associated upholstery portion and extends at the outer side over a vertical portion, and wherein at least one of the first and second non-expandable surface structures is counter-supported on the vertical portion.

5. The seat arrangement of claim 4, wherein at least one of the front and rear upholstery portions has an indentation through which the branch is arranged so as to extend.

6. The seat arrangement of claim 5, wherein the retention member has in at least one of the front and rear upholstery portions an insert which is connected to the associated upholstery portion in a locking manner and a receiving member for taking up forces of at least one of the first and second non-expandable surface structures.

7. The seat arrangement of claim 6, wherein the insert is secured to at least one of the front and rear upholstery portions at the outer side.

8. The seat arrangement of claim 7, wherein the insert is secured to at least one of the front and rear upholstery portions using an in-mold method.

9. The seat arrangement of claim 8, wherein the first and the second non-expandable surface structures are counter-supported on the upholstery member.

10. The seat arrangement of claim 9, wherein the upholstery member has the front upholstery portion in an X direction and the rear upholstery portion in the X direction, wherein these delimit a discharge path of the side airbag in an outward direction, wherein the first and second non-expandable surface structures are counter-supported on the front upholstery portion and/or the rear upholstery portion.

11. A seat arrangement for a vehicle comprising:
a support frame with a side airbag fixed thereto;
an upholstery member upholstered over the side airbag;
a tear seam for abrupt opening of a cover by the side airbag, wherein the tear seam is surrounded on a first, second, and third side b a first non-expandable surface structure, and wherein a second non-expandable surface structure is positioned between the first non-expandable surface structure and the first side of the tear seam; and
a retention member having a wire structure that counter-supports at least one of the non-expandable surface structures.

12. The seat arrangement of claim 11, wherein the wire structure has an inner structure which is arranged so as to extend in at least one of a front upholstery portion and a rear upholstery portion of the upholstery member, and which has a branch that is guided in a curved manner out of the associated upholstery portion and which extends at an outer side over a vertical portion, wherein at least one of the first and second non-expandable surface structures is counter-supported on the vertical portion.

13. The seat arrangement of claim 12, wherein at least one of the front and rear upholstery portions has an indentation through which the branch can extend.

14. The seat arrangement of claim 11, wherein the first and the second non-expandable surface structures are counter-supported on the upholstery member.

15. A seat arrangement for a vehicle comprising:
a support to which a side airbag is fixedly coupled, wherein the side airbag is upholstered by an upholstery member; and
a tear seam for abrupt opening of a cover by the side airbag, wherein the tear seam is surrounded on a first, second, and third side by a first non-expandable surface structure, and wherein a second non-expandable surface structure is positioned between the first non-expandable surface structure and the first side.

16. The seat arrangement of claim 15, wherein the upholstery member has a front upholstery portion and a rear upholstery portion, and wherein at least one of the front and rear upholstery portions is provided with a retention member, and wherein at least one of the first and second non-expandable surface structures is counter-supported on the retention member of the upholstery member.

17. The seat arrangement of claim 16, wherein the retention member has in at least one of the front and rear upholstery portions an insert that is connected to the associated upholstery portion in a locking manner and a receiving member for taking up forces of at least one of the first and second non-expandable surface structures.

18. The seat arrangement of claim 17, wherein the insert is secured to the at least one of the front and rear upholstery portions at an outer side using an in-mold method.

19. The seat arrangement of claim 15, wherein the upholstery member has a front upholstery portion in an X direction and a rear upholstery portion in the X direction, wherein these delimit a discharge path of the side airbag in an outward direction, wherein the first and second non-expandable surface structures are counter-supported on the front upholstery portion and/or the rear upholstery portion.

* * * * *

UNITED STATES PATENT AND TRADEMARK OFFICE
CERTIFICATE OF CORRECTION

PATENT NO. : 9,725,062 B2  
APPLICATION NO. : 15/003898  
DATED : August 8, 2017  
INVENTOR(S) : Kochem et al.

Page 1 of 1

It is certified that error appears in the above-identified patent and that said Letters Patent is hereby corrected as shown below:

In the Claims

Column 8, Claim 1, Line 66:
"b" should be --by--.

Column 9, Claim 11, Line 54:
"b" should be --by--.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*